Aug. 18, 1959
M. B. RIGGS
2,900,005
SAFETY TIRE CONSTRUCTION
Filed Aug. 9, 1954
3 Sheets-Sheet 1
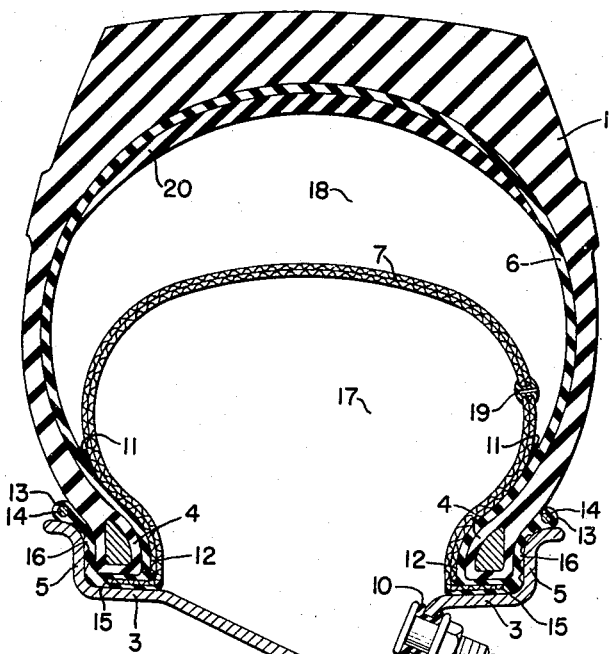
FIG. 1
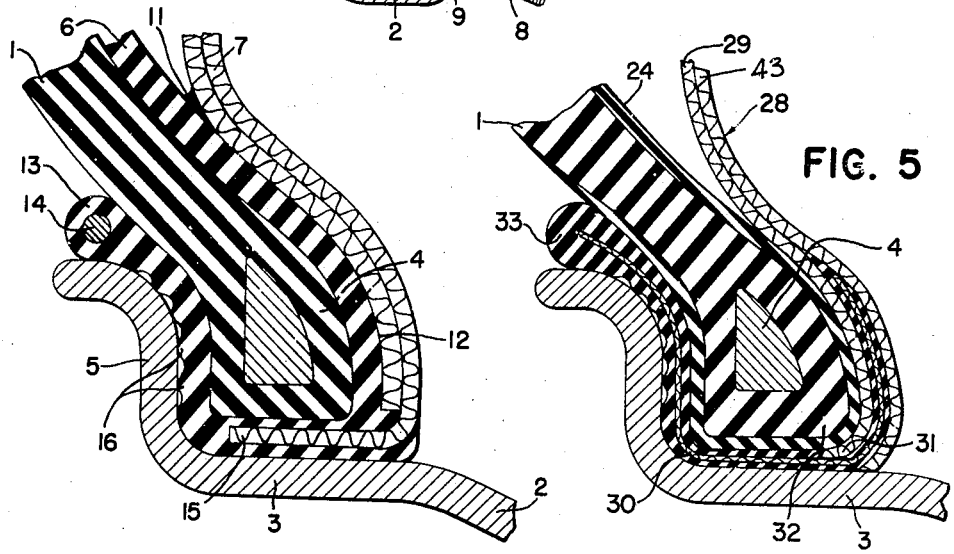
FIG. 2
FIG. 5
INVENTOR.
MART B. RIGGS
BY
*R. L. Miller*
ATTORNEY Aug. 18, 1959    M. B. RIGGS    2,900,005
SAFETY TIRE CONSTRUCTION
Filed Aug. 9, 1954    3 Sheets-Sheet 2

INVENTOR.
MART B. RIGGS
BY
P. L. Miller
ATTORNEY

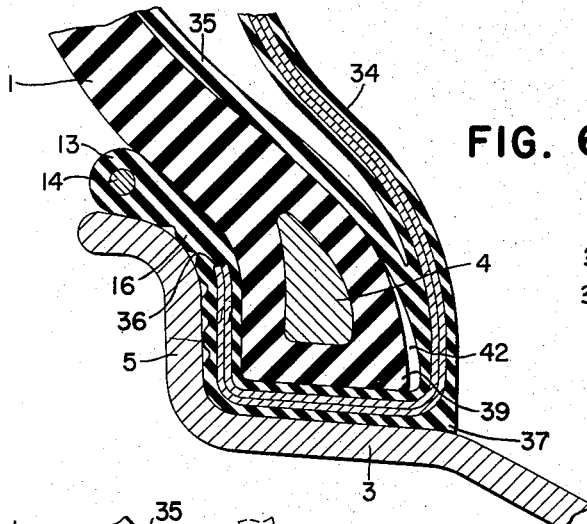
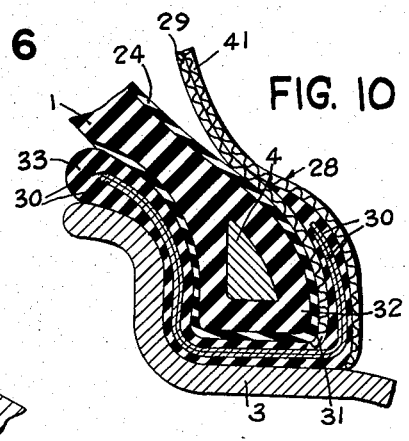
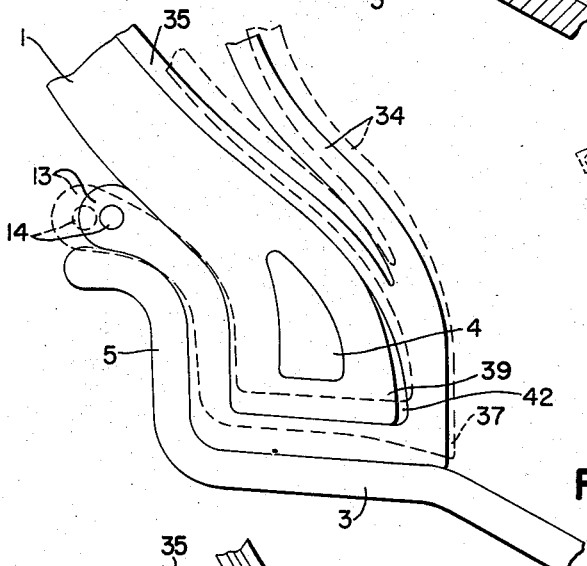
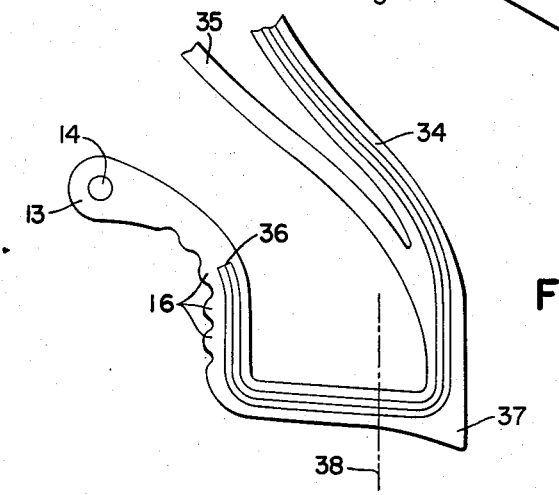
FIG. 6
FIG. 10
FIG. 9
FIG. 7
FIG. 8
FIG. 11
INVENTOR.
MART B. RIGGS

United States Patent Office 2,900,005
Patented Aug. 18, 1959

2,900,005

SAFETY TIRE CONSTRUCTION

Mart B. Riggs, Akron, Ohio, assignor to The Goodyear Tire & Rubber Company, Akron, Ohio, a corporation of Ohio Application August 9, 1954, Serial No. 448,534

9 Claims. (Cl. 152—341)

The present invention relates to a tubeless tire and rim construction in which an outer casing or tire is mounted on a rim which, together with an interposed diaphragm, forms an air chamber for keeping the tire distended. The invention as illustrated is adapted for use as either a single- or double-chambered tubeless tire and rim construction.

One object of this invention is to provide suitable means for locking a diaphragm in place between the tire and rim, whether used to create a single chamber or a double chamber within the tire.

Another object of this invention is to provide a diaphragm that may be releasably mounted on the tire prior to the mounting of the tire on the rim and in such a way as to assure its proper location when the tire is mounted.

A still further object of this invention is to provide means to be used either with the normal specially processed single-chambered tubeless tire or an ordinary tire to convert them into plural-chambered safety tires, whereby if a blowout occurs and air is lost from one chamber, the air in the other chamber will sustain the tire sufficiently to bring the car to a safe stop.

Other objects of the invention will appear as the description of the invention proceeds, the novel features, arrangements and combinations being described in the specification and in the claims thereunto appended.

In the drawings:

Fig. 1 is a transverse cross-section through an assembly embodying my invention;

Fig. 2 is an enlarged fragmentary view of the lower left-hand portion of Fig. 1;

Fig. 5 is a view similar to Fig. 2 showing another form;

Fig. 6 is a fragmentary view showing a still different form but generally similar to Figs. 1 and 2;

Fig. 7 is a schematic view illustrating the action in mounting the diaphragm of Fig. 6 on a rim and tire;

Fig. 8 is an outline of the edge of the diaphragm in its unstressed shape;

Fig. 9 is a view illustrating the compression of the portion of the diaphragm under the bead of a tire when mounted thereon;

Fig. 10 illustrates a modification of the invention illustrated in Fig. 5; and

Fig. 11 is a fragmentary view showing the arrangement of the cords with reference to the arrangement of the cords in the two layers of fabric illustrated in Fig. 10.

Figure 3:
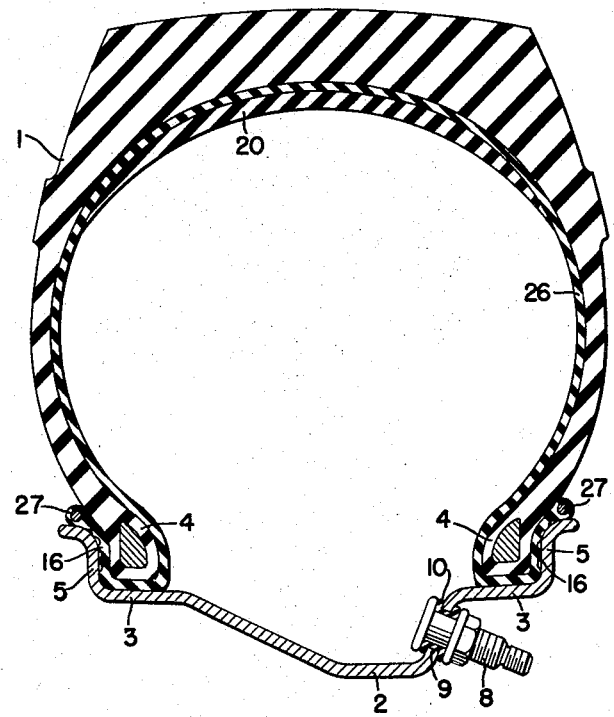
Fig. 3 is a view similar to Fig. 1 showing another form of the invention.

In Fig. 1 I have shown a tubeless safety tire created by use of a double diaphragm. An ordinary tire carcass 1, such as would normally be used with an inner tube, is mounted on a drop-center rim 2. The rim has bead seats 3 on which the beads 4 of the tire 1 normally seat and it also has side flanges 5 which prevent the beads from moving axially outward.

The ordinary tire is not constructed to retain air and normally is provided with an inflatable inner tube. Butyl rubber tubes have been found to retain air almost indefinitely and tubes of this type are now preferred. In order to make the normal tire impervious so that it can be mounted on a rim without a tube, it has been the practice to line the inner face of the tire with Butyl rubber or other air-impervious material. In applicant's invention it will be understood that natural rubber, Butyl rubber or other air-impervious or substantially air-impervious material may be used.

The feature of applicant's invention as shown in Fig. 1 is the provision of two diaphragms generally C-shaped in cross-section and retained in place by the seating of the tire on the rim. One diaphragm 6, made of Butyl rubber or the like, is of a size to conform approximately to the inner surface of the tire 1, and the other diaphragm 7 is made of rubberized fabric and so constructed as to be substantially non-stretchable. This diaphragm, when in place, spans the interior of the tire from bead to bead thereof and projects radially outwardly in an arched manner to divide the tire into two chanmbers, one of which, the outer chamber, being crescent-shaped and formed by the two diaphragms 6 and 7, and the other, the inner chamber, by the diaphragm 7 and the rim. The rim is made impervious by locking an inflation valve 8 in an opening 9 in the rim and making an air-tight seal therewith by employing a rubber washer 10 or the like.

The diaphragms 6 and 7 are united near the bead area, with their unjoined portions starting at points 11, preferably just radially outward of the beads and rim flanges. The joined portions 12 of the diaphragms extend from the points 11, with contiguous portions extending under the tire beads and then outwardly between the tire beads and rim flanges, terminating in enlarged retaining beads 13 just above the rim flanges. These beads 13 prevent the portions 12 being pulled out of position, and, as shown, they are reenforced with annular spring wire stiffening elements 14 embedded in the beads which stiffen the beads to resist inward movement thereof. While not required in all instances, these wires materially assist in holding the diaphragm in place on the tire during mounting and dismounting of same on the rim. The diaphragms are initially molded substantially to the shape shown so as to conform to the tire when placed thereon.

As shown in Fig. 2, the fabric ends 15 of at least one ply of the fabric diaphragm extend far enough to lie between and be clamped by the beads 4 and the rim seats therefor, whereby the outward extension of the fabric diaphragm, under the action of centrifugal force is resisted or, when the air is lost from the outer chamber, as when a blowout occurs. More than one layer of fabric may be so extended if desired. The joined edges of the diaphragm may be provided with flexible ribs 16 to form a better air seal with the rim if desired.

The inner chamber 17, formed by diaphragm 7 and the rim 2, is inflated directly by air introduced through the valve 8, and the outer chamber 18, formed by diaphragms 6 and 7, receives air through a small perforated grommet 19 having an opening in the neighborhood of .047 inch in diameter. This opening is made purposely small to retard leakage of the air from the inner to the outer chamber when a blowout occurs, so that while the tire will eventually go flat, the air in the inner chamber will sustain the tire until the car can be brought to a safe stop. In place of the grommet, one could use a valve designed to normally permit air to pass quickly from the inner to the outer chamber on inflation but which will stop or retard the flow of air from chamber 17 when a blowout destroys the outer chamber 18.

If desired, the diaphragm 6 may be provided with a layer of puncture-sealing material 20 to resist deflation caused by penetration of nails or other foreign objects through the tire 1 and diaphragm 6.

The double diaphragm is first placed on an unmounted tire in the same position as shown mounted. Then the tire and diaphragm are mounted on the rim in the usual manner for mounting a tire. The position of the beads 13 will indicate if the diaphragms are properly located after mounting. The beads 13 lie between the tire and the top of the rim on the flange and at least in part will be compressed so as to effect a further sealing at these points as well as indicate a proper mounting of the diaphragm.

Figure 4:
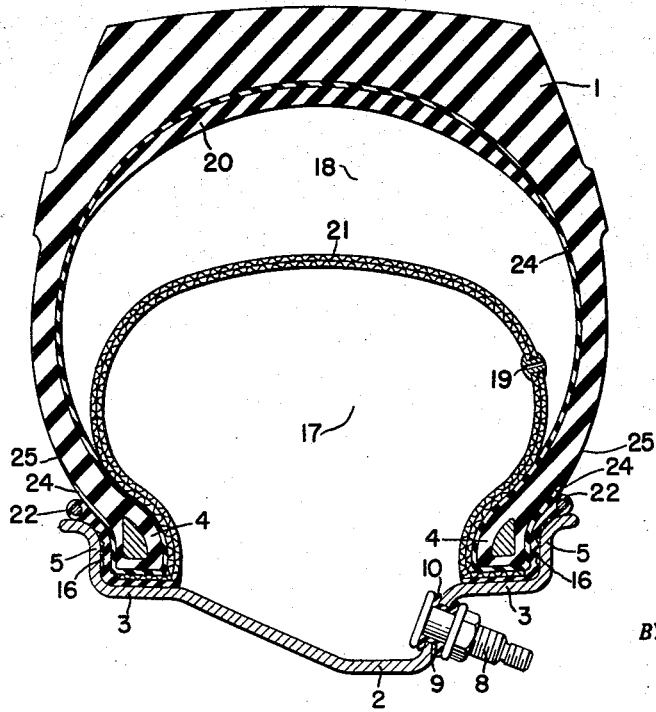
Fig. 4 is a view similar to Fig. 1 showing another form of the invention.

In Fig. 4, wherein the same numerals indicate similar parts in Fig. 1, a similar tubeless safety tire is shown but in this case the outer diaphragm shown at 6 in Fig. 1 is eliminated and a single diaphragm 21, in all respects like that shown at 7 in Fig. 1 and with terminal beads 22 similar to 13 in Fig. 1, is the auxiliary element and in place of the diaphragm 6, the tire 23 is lined with an integral impervious liner 24 that covers the entire interior surface of the tire and extends around the beads to the points 25. This liner is cemented or vulcanized to the tire to form an integral part thereof. The diaphragm operates the same as that shown in Fig. 1.

In Fig. 3, where the same numerals indicate similar parts in the other figures, we have shown a single-chambered tubeless tire formed by using an ordinary tire 1, and a single diaphragm 26 terminating in beads 27 and in all other respects being comparable to the outer diaphragm 6 in Fig. 1. It is used to convert the ordinary tire into a tubeless tire by lining it with an easily removable liner that will be properly located on the tire before it is mounted and which will retain its proper position during mounting.

In Fig. 5 we have shown a still further modification of our invention illustrating an alternative construction, particularly with respect to the fabric-reinforced diaphragm of Fig. 4. In Fig. 4 the diaphragm 21 is shown as being separate from the lining 24, whereas in Figs. 1 and 2 the diaphragm 7, which corresponds to diaphragm 21 in Fig. 4, is integrally connected to the diaphragm 6 which corresponds to 24 in Fig. 4. It is to be understood that the construction shown in Fig. 5 can be used with the modification shown in Figs. 1 and 2 in an obvious manner as will be apparent from the description of Fig. 5, since the only difference is that the fabric diaphragm in Fig. 4 is separate from the diaphragm 24 in Fig. 4, instead of being integrally connected as are diaphragms 7 and 6 in Figs. 1 and 2. It is therefore believed to be unnecessary to illustrate in another view the application of the principle employed in Fig. 5 to the invention disclosed in Figs. 1 and 2.

In Fig. 5 the same reference numerals correspond to the similar parts in the other views. The diaphragm 28 is composed of two layers of cord fabric 29 and 43, in each of which the cords are laid parallel to each other but at opposite angles with respect to the cords in the other layer and at a relatively small angle, less than 45° with respect to the circumferential center line of the diaphragm, so as to reduce the permissible stretch under the action of centrifugal force. This feature is not new since it is embodied in present devices of this character. Of course the cord layers 29 and 43 are impregnated with rubber so as to make an air-tight chamber.

Ordinarily cotton cord is used for this purpose as it is relatively inexpensive but, on the other hand, in order to get the strength necessary in the diaphragm the cords must be of appreciable thickness and therefore the diaphragm 28 will be of substantial thickness and very bulky. This increases the difficulty of mounting the tire. In Figs. 1, 2 and 4, where a cotton cord is illustrated, it will be found that even one layer of the fabric is relatively thick and, since it must occupy a position between the tire bead and the rim, it will increase the difficulty of mounting the tire on the rim. It is very desirable, however, to have the edge of the fabric tie in under the bead so that the pressure of the bead against it will tend to hold the diaphragm in place and prevent the stretch or outward movement of the diaphragm under the action of centrifugal force or under the internal air pressure within the inner chamber after a blowout occurs.

In order to overcome this bulkiness we have found that we can use a layer of high-strength material 30 which is very thin and place this between the plies of fabric 29 and 43 and have it overlap the layers 29 a considerable distance, as illustrated. This fabric then extends underneath the bead and between the bead and the rim flange so that strength is imparted, not only to the part of the diaphragm beneath the bead and to the free portion within the tire, but also to the portion lying between the rim flange and the bead. It will be noted that the outer layer of fabric 29 has a portion 31 lying underneath the toe of the bead where it is possible to have some bulkiness without interfering particularly with the mounting of the tire since the toe 32 of the bead will yield somewhat in a radial direction and in view of the fact that the bead seat on the rim usually slopes slightly toward the drop-center portion thereof. The layer of fabric 30 is preferably square-woven nylon fabric impregnated with rubber. Preferably we employ two layers of this nylon fabric as shown in Fig. 10, each layer being approximately .004" in thickness so that with two layers of nylon there is only approximately .008 inch of fabric and on top of this and incorporated with it is sufficient rubber or synthetic rubber to increase the thickness about .020 inch, making a total thickness of .028 inch between the surfaces of the diaphragm which lie between the tire and the rim. It is preferred that most of the rubber be placed between the layers of nylon fabric although the outer surfaces should have a sufficient coating of rubber to prevent abrasion of the fabric by any relative movement between the tire bead and rim. This thickness of the two layers of nylon, plus that of the rubber, is still well under the thickness of a layer of cotton cord fabric of the required strength, plus the required amount of rubber on the opposite sides of same as illustrated in the forms of the invention shown in Figs. 1, 2 and 3.

It is to be understood that it is not absolutely necessary to have the outer layer of fabric 29 extend under the bead as at 31 but this is preferred. It is also within the scope of the invention to have the inner layer of material 43 extend under the toe of the bead in the manner illustrated in Fig. 2 in connection with the inner layer of fabric of the diaphragm 7 shown in Fig. 2. However the construction shown in Fig. 5 is preferred.

Other high-strength fabrics besides nylon may be used for this purpose as long as its strength is sufficient for the required purposes and its thickness is not appreciably more than that of the nylon for the same strength.

In Figures 6, 7, 8 and 9 there is shown a modification of the invention similar to Figs. 1 and 2 in this respect, namely, that there is provided a generally C-shaped diaphragm 34 which corresponds to the diaphragm 7 and a liner 35 similar to 6 of the aforesaid figures. The general construction, mounting and operation of the diaphragm in Figs. 6 to 9 inclusive is substantially the same as for the forms shown in Figs. 1 and 2 but there are certain important features of novelty not disclosed in Figures 1–5 inclusive.

In Figure 6 only a partial cross-sectional view is shown but it is understood that the same is constructed as a complete diaphragm, such as in Figure 1, spanning the interior of the tire and provided at each of the opposite edges with a construction similar to that shown in Figure 6. In Figures 6, 7, 8 and 9 similar reference characters refer to similar parts in the other views. The tire 1 having the bead portion 4, and the rim 3 having the flange 5, are the same as illustrated in the other forms of the invention. In this view the inner diaphragm 34 comprises two layers of reinforced strain-resisting elements, preferably nylon monofilaments or single or multiple-stranded wire, the reinforcing elements in each layer extending from bead to bead and being arranged in crossed relation with respect to each other similar to the two layers of cord fabric used in tire construction, the angles of the strain-resisting elements each forming an angle of between 20 and 50 degrees with the circumferential center-line of the diaphragm. Preferably the angle should be about 35° as this angle avoids difficulties encountered in shaping the diaphragm from a flat band and yet is sufficient to minimize "peaking" of the center portion of the diaphragm due to centrifugal force acting on the diaphragm when in use. "Peaking" is the enlarging of the outer peripheral dimension of the diaphragm at its mid-portion under centrifugal force.

These tension elements are coated with a flexible rubber or rubber-like compound and preferably have a cushion of rubber therebetween and, while I have illustrated a plurality of layers of strain-resisting elements, one layer only may be employed.

It will be noted in Fig. 6 that the outer edge of the fabric layer within the diaphragm terminates at a point 36, which point lies inwardly of the free edge 13 of the diaphragm below the outermost one of the sealing ribs 16 similar to those of Figs. 1 and 2. This is important in order to prevent loss of air by wicking or bleeding. In the molding of the diaphragm, it is possible that the strain-resisting elements will be too close to the surface of the surrounding rubber and may even be exposed after the diaphragm is molded. It is also understandable that after a period of time the abrading action between the tire or rim and the abutting portions of the diaphragm beneath the bead will become worn and thus expose the strain-resisting elements. It is then possible for the air within the tire to travel along these elements to a point where they are exposed and cause a loss of air in the tire. However, by stopping the layer of fabric short of the outer edge of the diaphragm at a point below the edge of the rim flange any escaping air is trapped within the tire by the all-rubber portion of the diaphragm outwardly of the ends of the fabric layer or layers. Leakage of air from within the tire is thereby prevented, whereas, if the fabric layer extended beyond the last of the sealing ribs or the sealing area (if no sealing ribs are used) the air may be discharged to the atmosphere and the tire lose pressure.

In Fig. 8 there is shown by way of an outline, the general cross-sectional shape of one of the U-shaped edge extensions on the diaphragm and is applicable to all forms of the invention. At the inner edge of the U-shaped portion the diaphragm is thickened as at 37. This area is generally wedge shaped and is gradually thickened from approximately the point indicated at 38 to the inner edge of the diaphragm. When the diaphragm is mounted this portion lies axially inwardly of the reinforcing element in the bead and the purpose of thickening the diaphragm at this point is to secure substantially as much seal under the toe of the bead as under the reinforcing elements of the bead itself. The toe portion 39 of the tire will normally yield radially to a much greater extent than the part under the restraining elements of the bead and therefore can accommodate more thickness. If the thickness of the diaphragm in this area is increased, a better sealing effect at this point will be accomplished. By using different barriers to prevent escape of the air that is in the tire, a better sealing effect can be obtained.

Perhaps most of the sealing effect is accomplished at the sealing area near the ribs 16 on the diaphragm, because of the axial pressure of the air in the tire which tends to force the beads against the side flanges, although underneath the bead area considerable force results, at least initially, when the tire and diaphragm are mounted on the rim. This initial force under the bead, later may become less as the material of the diaphragm wears away, whereas the pressure on the sealing ribs, such as 16, is not decreased because of any wear such as occurs in the sealing area.

A very important feature of the invention, applicable to all forms of the invention, is illustrated particularly in Figs. 7 and 9. In Fig. 7 there is illustrated a diaphragm and tire mounted on a rim as in Fig. 6 but minus the fabric layers and other appurtenances shown in Fig. 6. The diaphragm and tire are shown in their mounted position by solid lines. However, the normal outer diameter of the base portion of the diaphragm, unmounted, is greater than the inner bead diameter of the tire and this is illustrated by dotted lines in Fig. 7. Thus, when the diaphragm is placed within the tire it is necessary to compress the base of the diaphragm in a peripheral direction in order to position it as illustrated in Fig. 6 and by solid lines in Fig. 7. This results in a peripheral compression of the base portion of the diaphragm as illustrated schematically in Fig. 9 in which the upper dotted part of this figure at 40 indicates the relative positions of cords in the tire fabric before the diaphragm is mounted on the tire. The part illustrated is the part of the diaphragm that goes under the bead. The bottom portion of Fig. 9 indicated by the reference character 41 shows the compressed state of the same portion after mounting. In this view the rubber is compressed in a peripheral direction which in turn causes a radial thickening of this part. The cords are arranged closer together and the crowding of the material of the base portion of the diaphragm in a peripheral direction sets up a stress in the rubber which increases the sealing effect underneath the bead area of the tire.

In addition, this peripheral compression of the base portion of the diaphragm creates an inwardly directed radial force acting on the flared part of the diaphragm that lies between the side flange on the rim and the tire bead and this tends to deflect the flared portion into a vertical plane and thus it is moved axially against the tire bead whereby it snugly embraces the bead. This fact, plus the fact that the diaphragm at the base portion is under a circumferential compression which also develops an outwardly radial force tending to hold the base of the diaphragm against the base of the tire, provides means for insuring that when the tire is being mounted the diaphragm will hold its position with respect to the tire. It is obvious why this is necessary because the tire with the diaphragm mounted thereon is first mounted on the rim with these parts in the drop-center portion or well in the rim, then as the air pressure forces the beads and corresponding parts of the diaphragm onto the rim seats, there is a tendency for the diaphragm to be pulled out from beneath the bead. The greater the force holding the diaphragm snugly against the tire, the greater the resistance to the shifting of the diaphragm out of proper position. It is also important for the proper mounting of the tires that the fabric portion of the diaphragm extend up into the portion around the heel of the bead and adjacent the outer surface of the bead area, otherwise there would be a tendency for this portion which lies between the flange on the rim and the tire bead to stretch during the mounting operation whereas the fabric makes this portion of the diaphragm substantially unstretchable.

To summarize the features which have just been described with reference to the mounting of the tire, it will be obvious that since the diaphragm is under a peripheral compression in the bead-adjacent area, that the diaphragm will be held against the tire more firmly than where the diaphragm is made of a size slightly smaller than the inner bead diameter of the tire or just the same size. The mount of oversize of the bead-contacting area of the diaphragm with respect to the inner diameter of the beads should be in the neighborhood of approximately ⅜". This is sufficient to get a snug fit of the diaphragm about the beads while at the same time not being sufficient to cause a buckling of the fabric in the diaphragm. The ⅜" larger diameter is about right for passenger tires mounted on 15" or 16" rims but for larger tires may have to be increased somewhat for a snug fit.

As an additional feature, it is to be noted that the U-shaped portion of the diaphragm that receives the tire bead is made slightly wider than the normal width of the bead at the base thereof. This results in a clearance 42 between the bead and the adjacent surface of the diaphragm if the bead is not wide enough to fill the U-shaped portion. This is important because it insures that the bead will be bottomed completely on the adjacent portion of the diaphragm whereas, if an attempt were made to make the bead and the bead-receiving portion of the diaphragm the same dimension, difficulty would be encountered. In the first place, beads are not always of the same width and vary somewhat, particularly between tires of different manufacturers. Also a single diaphragm of a given size can be used with different sizes of tires having different bead widths within a given range. In tires of different sizes the beads are of different widths but usually it would not require more than three sizes of diaphragms to fit a complete line of passenger tires, all of which are adapted to be mounted on the same diameter wheel. In other words, passenger tires are generally made for certain wheel diameters and this makes it possible to use a single diaphragm for different tires having different cross sections and slightly different bead widths. If the bead of the tire is narrower than the channels in the diaphragm this clearance space 42 will substantially disappear because of the centrifugal action on the diaphragm or in the case of a blowout where there is also pressure only in the inner chamber.

The extra thickness of rubber at the inner toe portion of the base of the diaphragm also reinforces the diaphragm at this point so that when the diaphragm is mounted on a tire there is little tendency for the strain-resisting elements to crack or break. At least this danger of breakage at the toe of the tire will be lessened because of the fact that the additional rubber tends to cause the fabric passing around the toe of the bead to position itself in a slight arc rather than at right angles.

The material used in this diaphragm should be one in which there is preferably a low cord count rather than a high cord count, but the count used will be controlled to a large extent on the strength requirements but the lower cord count permits more rubber or rubber-like material between the cords for better sealing and cushioning action. The larger the diameter of the strain-resisting element, the less the cord count should be. The diaphragm, if employing but a single layer or a double layer having only a single layer under the bead as in Fig. 5, may have the strain-resisting elements as large as .020" diameter but if two layers extend under the bead this diameter should be about .014" with the total thickness of the diaphragm under the bead in the neighborhood of between .032" and .040", including the rubber.

A monofilament nylon cord may be used but a wire-reinforcing element either solid or stranded has been found to be satisfactory. As pointed out earlier, it is important that the diameter of the filaments be kept as low as possible consistent with the desired strength so as not to increase the thickness of the base portion of the diaphragm beyond that which would make it practical for use with tires and rims of standard sizes designed to be used normally with an inner tube, it being understood that these diaphragms are to be used with tires normally made to fit rather firmly on the bead seats on a rim and that any undue thickness of the part of the diaphragm that extends under the bead will prevent proper mounting of the tire and diaphragm on the rim.

It is understood that the liner portion 35 may be omitted if not desired and such is the case where the tire itself is constructed to hold air without substantial loss as is the case with what is commonly referred to as a tubeless tire.

It is to be understood that the diaphragms shown in Figs. 1 to 5 inclusive may use material such as that specified in connection with Figs. 6 to 9 inclusive.

It will be understood that in the drawings the thickness of the strain-resisting elements and of the rubber coating is considerably magnified as regards the proportions of the bead and rim. This has been done for the sake of clarity in the drawings since the showing of actual proportions would be very difficult and would only tend to confuse the drawings.

This application is a continuation-in-part of application for Safety Tire Construction, Serial No. 269,936 filed February 5, 1952, now Patent No. 2,756,800 granted July 31, 1956.

While certain representative embodiments and details have been shown for the purpose of illustrating the invention, it will be apparent to those skilled in this art that various changes and modifications may be made therein without departing from the spirit or scope of the invention.

Having thus fully described my invention, what is claimed and for which Letters Patent of the United States is desired is:

1. A diaphragm for use in combination with an open-bellied tire having beads and a rim provided with tire bead mounting seats, comprising an annular outwardly bowed portion of generally C-shape, which, when mounted with said tire on said rim, spans the space between the beads of said tire throughout the peripheral extent thereof, said C-shaped portion having a substantially lesser outer diameter at its median plane than the inner tread surface of said tire but greater than the inner diameter of the tire beads, whereby, when mounted with said tire and rim, it provides an inner rim adjacent chamber and an outer tire adjacent chamber, said C-shaped portion constituting a reserve tire for carrying the load when the outer chamber fails and being made of materials which, when both of said chambers are inflated to normal operating pressures, restrain the C-shaped portion of the diaphragm in a position spaced substantially from the inner tread surface of said tire, means for inflating said chambers, and means integral with said C-shaped portion for separably holding said C-shaped portion in place on said tire and rim, comprising two annular extensions, one at each of the opposite edges of said C-shaped portion, each extension having a first portion extended axially outward to engage under the base of the adjacent tire bead, and a second portion extending radially outward to engage the bead at the outer sidewall of said tire when said diaphragm is mounted thereon, each of said first portions having a greater normal outer diameter, unmounted, than the inner diameter of the bead of said tire on which it is to be mounted and made of resilient material compressible in a circumferential direction to permit reduction of its circumferential dimension to fit the base of said tire bead.

2. A diaphragm as set forth in claim 1 in which the diameter of each of said first portions of said extensions is in the order of ⅜ inch greater than the inner diameter of the bead on which it is to be mounted.

3. A diaphragm as set forth in claim 1 in which a second C-shaped annular portion, of larger outer diameter than said first C-shaped portion, surrounds the first C-shaped portion and is joined thereto at its edges to form an air chamber externally of said first C-shaped member.

4. A diaphragm for use in combination with an open-bellied tire having beads and a rim provided with tire bead mounting seats, having retaining flanges at the outer edges thereof, comprising an annular outwardly bowed portion of generally C-shape, which, when mounted with said tire on said rim, spans the space between the beads of said tire throughout the peripheral extent thereof, said C-shaped portion having a substantially lesser outer diameter at its median plane than the inner tread surface of said tire but greater than the inner diameter of the tire beads, whereby, when mounted with said tire and rim, it provides an inner rim adjacent chamber and an outer tire adjacent chamber, said C-shaped portion constituting a reserve tire for carrying the load when the outer chamber fails and being made of materials which, when both of said chambers are inflated to normal operating pressures, restrain the outwardly bower portion of the diaphragm in a position spaced substantially from the inner tread surface of said tire, means for inflating said chambers, and means integral with said C-shaped portion for separately holding said C-shaped portion in place on said tire and rim, comprising two annular extensions, one at each of the opposite edges of said C-shaped portion, each extension having a first portion extended axially outward to engage under the base of the adjacent tire bead, and a second portion extending radially outward to engage the adjacent bead retaining flange and the adjacent bead at the outer sidewall of said tire when said diaphragm is mounted thereon, each of said second portions of said extensions terminating in an annular enlarged bead of greater thickness than the sealing portion between it and the adjacent said first portion and arranged on said second portion a distance above said first portion such that when mounted on said tire and rim it will lie at least in part above said side flange, each of said first portions having a greater normal outer diameter, unmounted, then the inner diameter of the bead of said tire and made of resilient material compressible in a circumferential direction to permit reduction of its circumferential dimension to fit the base of said tire bead.

5. A diaphragm as set forth in claim 4 in which the enlarged bead is reinforced by a stiffening element incorporated therein.

6. A diaphragm as set forth in claim 4 in which the enlarged bead is reinforced by an annular band of spring wire incorporated therein.

7. In combination, an open-bellied tire having beads, a rim provided with tire bead mounting seats, and a diaphragm comprising an annular outwardly bowed portion of generally C-shape spanning the space between the beads of said tire throughout the peripheral extent thereof, said C-shaped portion having a substantially lesser outer diameter at its median plane than the inner tread surface of said tire but greater than the inner diameter of the tire beads, whereby, when mounted with said tire and rim, it provides an inner rim adjacent chamber and an outer tire adjacent chamber, said C-shaped portion constituting a reserve tire for carrying the load when the outer chamber fails and being made of materials which, when both of said chambers are inflated to normal operating pressures, restrain the C-shaped portion of the diaphragm in a position spaced substantially from the inner tread surface of said tire, means for inflating said chambers, and means integral with said C-shaped portion for separately holding said diaphragm member in place on said tire and rim, comprising two annular extensions, one at each of the opposite edges of said C-shaped portion, each extension having a first portion extended axially outward between the base of the adjacent tire bead and adjacent rim seat, and a second portion extending radially outward to engage the bead at the outer sidewall of said tire, each of said first portions having a greater normal outer diameter, unmounted, than the inner diameter of the bead of said tire on which it is mounted and made of resilient material compressible in a circumferential direction to permit reduction of its circumferential dimension to fit the base of said tire bead.

8. The combination set forth in claim 7 in which a second C-shaped annular portion, of larger outer diameter than said first C-shaped portion surrounds the first C-shaped portion and is joined thereto at its edges to form therewith an air chamber externally of said C-shaped member.

9. A diaphragm for use in combination with an open-bellied tire having beads and a rim provided with tire bead mounting seats, comprising an annular outwardly bowed portion of generally C-shape, which, when mounted with said tire on said rim, spans the space between the beads of said tire throughout the peripheral extent thereof, said C-shaped portion having a substantially lesser outer diameter at its median plane than the inner tread surface of said tire but greater than the inner diameter of the tire beads, whereby, when mounted with said tire and rim, it provides an inner rim adjacent chamber and an outer tire adjacent chamber, said C-shaped portion constituting a reserve tire for carrying the load when the outer chamber fails and being made of materials which, when both of said chambers are inflated to normal operating pressures, restrain the C-shaped portion of the diaphragm in a position spaced substantially from the inner tread surface of said tire, means for inflating said chambers, and means integral with said C-shaped portion for separately holding said C-shaped portion in place on said tire and rim, comprising two annular extensions, one at each of the opposite edges of said C-shaped portion, each extension being adapted to engage under the base of an adjacent tire bead when mounted thereon and each having a greater normal outer diameter, unmounted, than the inner diameter of the bead of said tire on which it is to be mounted and made of resilient material compressible in a circumferential direction to permit reduction of its circumferential dimension to fit the base of said tire bead.

References Cited in the file of this patent

UNITED STATES PATENTS

| | | |
|---|---|---|
| 1,640,844 | Main | Aug. 30, 1927 |
| 1,880,489 | Roberts | Oct. 4, 1932 |
| 2,122,740 | Ekenroth | July 5, 1938 |
| 2,186,178 | Shoemaker | Jan. 9, 1940 |
| 2,200,916 | Crowley | May 14, 1940 |
| 2,410,209 | Godsey | Oct. 29, 1946 |
| 2,592,844 | Antonson | Apr. 15, 1952 |
| 2,598,115 | Dodge | May 27, 1952 |
| 2,665,731 | Slezak | Jan. 12, 1954 |
| 2,756,800 | Riggs | July 31, 1956 |
| 2,811,189 | Howard | Oct. 29, 1957 |

FOREIGN PATENTS

| | | |
|---|---|---|
| 1,008,743 | France | Feb. 27, 1952 |
| 860,151 | Germany | Dec. 18, 1952 |
| 886,697 | Germany | Aug. 17, 1953 |
| 1,049,414 | France | Aug. 19, 1953 |

(Corresponding U.S. 2,698,042, Dec. 28, 1954)

OTHER REFERENCES

Tires, Service Station, vol. XXXII, No. 7, February 1951, p. 36.

UNITED STATES PATENT OFFICE
CERTIFICATE OF CORRECTION

Patent No. 2,900,005                                              August 18, 1959

Mart B. Riggs

It is hereby certified that error appears in the printed specification of the above numbered patent requiring correction and that the said Letters Patent should read as corrected below.

Column 6, line 70, for "mount" read -- amount --; column 9, line 28, for "then" read -- than --; column 10, line 9, after "said" insert -- first --.

Signed and sealed this 16th day of February 1960.

(SEAL)
Attest:

KARL H. AXLINE
Attesting Officer

ROBERT C. WATSON
Commissioner of Patents